Feb. 22, 1966     R. B. BLIZARD     3,237,153
DETECTION OF ACOUSTIC SIGNALS
Filed Sept. 21, 1959     4 Sheets-Sheet 1

INVENTOR
ROBERT B. BLIZARD
BY
his ATTORNEYS

Feb. 22, 1966   R. B. BLIZARD   3,237,153
DETECTION OF ACOUSTIC SIGNALS
Filed Sept. 21, 1959   4 Sheets-Sheet 2

*INVENTOR*
ROBERT B. BLIZARD
BY
his   ATTORNEYS

Feb. 22, 1966   R. B. BLIZARD   3,237,153
DETECTION OF ACOUSTIC SIGNALS
Filed Sept. 21, 1959   4 Sheets-Sheet 3

INVENTOR
ROBERT B. BLIZARD
BY
his   ATTORNEYS

United States Patent Office 3,237,153
Patented Feb. 22, 1966

3,237,153
DETECTION OF ACOUSTIC SIGNALS
Robert B. Blizard, Houston, Tex., assignor to Schlumberger Well Surveying Corporation, Houston, Tex., a corporation of Texas
Filed Sept. 21, 1959, Ser. No. 841,396
15 Claims. (Cl. 340—18)

This invention relates to an apparatus for detecting signals. More particularly, it has to do with new and improved techniques and means for accurately determining the time of arrival of acoustic waves of varying amplitude.

A knowledge of the velocity of propagation of acoustic waves is often useful in determining the characteristics of a medium. In the field of geophysical exploration, for example, the velocity of acoustic waves in the earth formations surrounding a bore will often reveal a characteristic of the formations such as its porosity. The usual method of determining this velocity is to dispose at least one acoustic wave transmitter and at least two receivers in the bore and measure the time required for a wave from a transmitter to travel the distance between the receivers. Measurements made in this manner have not always been accurate, however, because of the difficulty of determining the exact time of arrival of the wave at the receivers.

It is, therefore, an object of this invention to provide novel and useful systems for accurately determining the time of the "first arrival" of an acoustic wave at a receiver.

Still another object of the invention is to provide new and improved acoustic well logging systems which are capable of distinguishing reliably between signals generated by random noise sources and characteristic signals generated by an acoustic wave transmitter.

Another object of the invention is to provide new and improved acoustic wave detection systems which have greatly reduced sensitivity to noise.

These and other objects of the invention are attained by providing detecting means that act in response to the electrical signal generated when acoustic waves reach an acoustic receiver. The detecting means provide outputs that depend upon the characteristics of the electric signal. These outputs are combined in a coincidence circuit in such a manner that the accuracy of the entire system is increased substantially over conventional detecting systems and the sensitivity of the systems to stray noise signals is substantially decreased.

This invention may be better understood from the following detailed description of representative embodiments taken in conjunction with the accompanying drawings in which.

Figure 1:
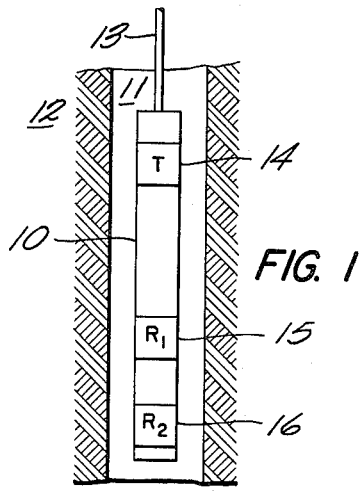
FIG. 1 is a section through the earth schematically illustrating a typical acoustic well logging apparatus disposed in a well drilled into the earth.

In FIG. 1 is illustrated a typical acoustic well logging apparatus which includes a support 10 lowered by a cable 13 into a bore 11 surrounded by earth formations 12. The support 10 is lowered and raised in the bore by a conventional winch (not shown) at the surface of the ground. Mounted in longitudinally spaced apart relation on the support 10 are an acoustic wave transmitter 14 and two acoustic wave receivers 15 and 16. The transmitter and the two receivers are electrically connected to apparatus at the surface of the ground by conductors usually contained within the cable 13 and insulated therefrom.

The transmitter 14 and the two receivers 15 and 16 are conventional in design. A transmitter that has been found suitable includes a toroidal coil that surrounds a cylinder of magnetostrictive material that generates an acoustic wave in the bore fluid when the coil is energized by an electrical impulse. The two receivers 15 and 16 may be similarly constructed or they may simply consist of a flexible diaphragm connected to a coil that generates an electrical signal when the diaphragm vibrates.

The intensity of the acoustic wave generated in response to an electrical impulse by a transmitter 14 of the type described above, or of others of conventional design, varies approximately sinusoidally at a constant frequency. The acoustic wave is in the form of a burst of energy having a first positive-going excursion, or peak, of increasing intensity followed by a second, negative-going excursion, or peak, of decreasing intensity, the second peak having about twice the amplitude of the first. The third and subsequent peaks have ever decreasing amplitudes and are alternately positive-going and negative-going. This wave is modified somewhat by the surrounding earth formation before it reaches the receivers 15 and 16. At the receivers, the second negative-going peak of a characteristic acoustic wave usually has an amplitude about three times the amplitude of the first peak and the third peak may have an amplitude about ten times that of the first peak. The exact times of arrival of the third peak and all subsqeuent peaks are relatively more affected by interference between the direct wave and multiple reflected waves (or waves arriving by different paths) as compared to the first and the second peaks. For this reason, it is usually considered desirable to trigger the detecting systems connected to the receivers on either the first or the second peak.

When the apparatus shown in FIG. 1 is being employed to determine the velocity of acoustic waves in the formations, the transmitter 14 generates acoustic waves which travel through the earth formation 12 and reach the two receivers 15 and 16 in succession. Two electrical detecting systems, which are connected to be responsive to the receivers, are triggered by the voltages generated as the acoustic waves reach the receivers. The time interval between the triggering of the two detecting systems is measured and the wave velocity in the formation is then calculated, the spacing between the two receivers being known.

Figure 9:
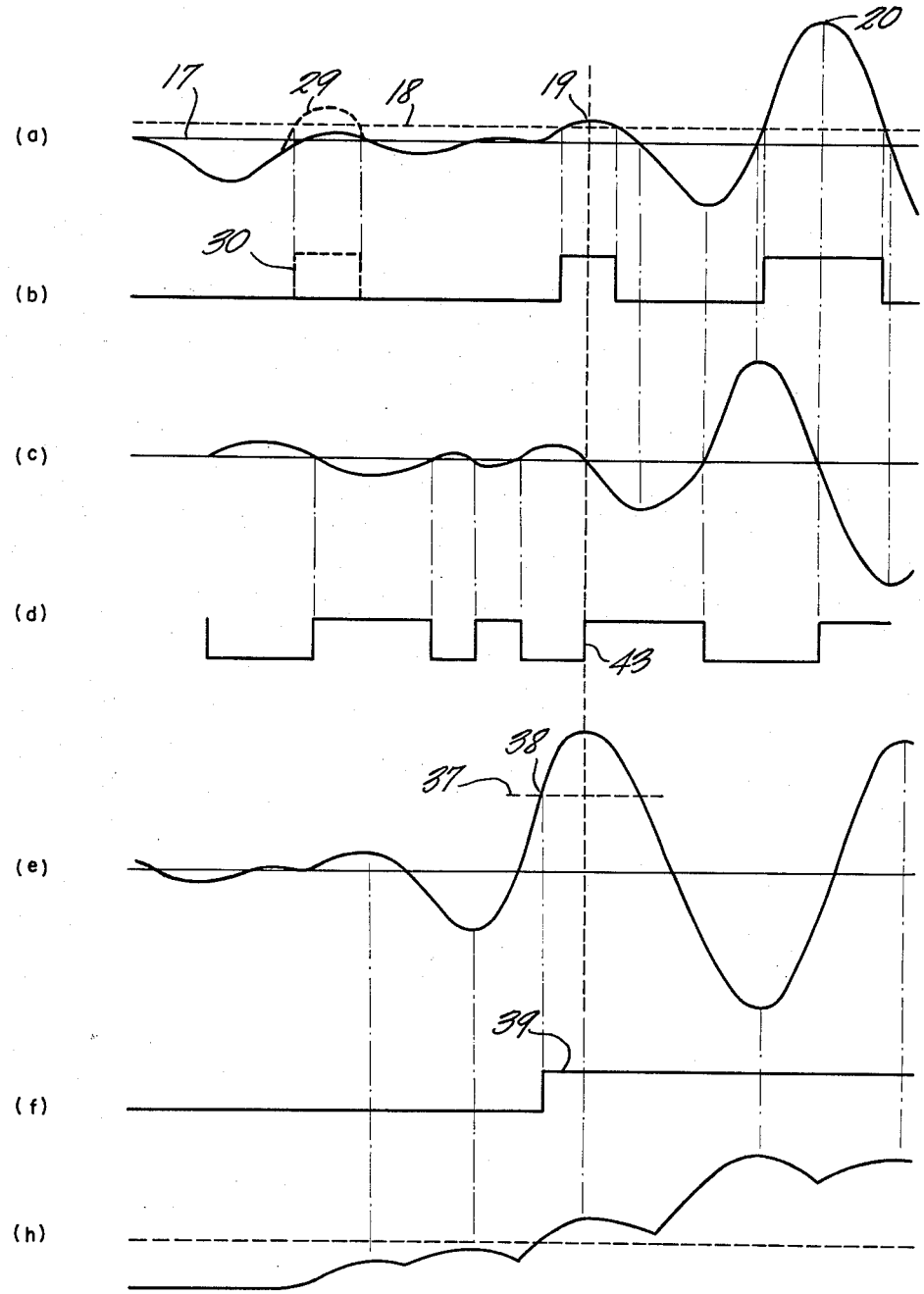
FIG. 9 is a graph of typical waveforms that are helpful in explaining the operation of the novel detecting systems illustrated in FIGS. 2–6 and 8.

To achieve highly accurate measurements, however, it is essential that the electrical detecting systems connected to the receivers be triggered at corresponding points on the acoustic waves as the waves reach the receivers. This requirement is better explained by reference to FIG. 9 in which waveform (a) represents a typical voltage generated when an acoustic wave reaches a receiver. Ideally, the detecting system connected to each of the receivers should be triggered either when the voltage generated by the receiver first exceeds the zero voltage level 17, or at the time corresponding to the first peak 19, because the wave tends to become distorted after this point. However, if the detecting system is set to be triggered by any voltage above the zero voltage level 17, difficulty is encountered because the detecting system will also be triggered by noise signals. Other kinds of inaccurate results are likely to be obtained when the limiting threshold of the detecting system is set at a positive value high enough so that the system is insensitive to stray noise signals because the strength of the incoming acoustic waves varies. A strong wave will trigger the system at a point relatively near the base of the wave while a weak wave will trigger the system at a point closer to the peak. Also, the detecting system may fail to be triggered at all if the incoming acoustic wave is of a very small amplitude.

These difficulties are overcome by employing a detecting system constructed in accordance with the invention such as one of the types illustrated in FIGS. 2–6. In a preferred application of the invention, one of the systems illustrated is connected to the output from each of the receivers 15 and 16 and both are triggered at corresponding points on an incoming acoustic wave.

Figure 2:
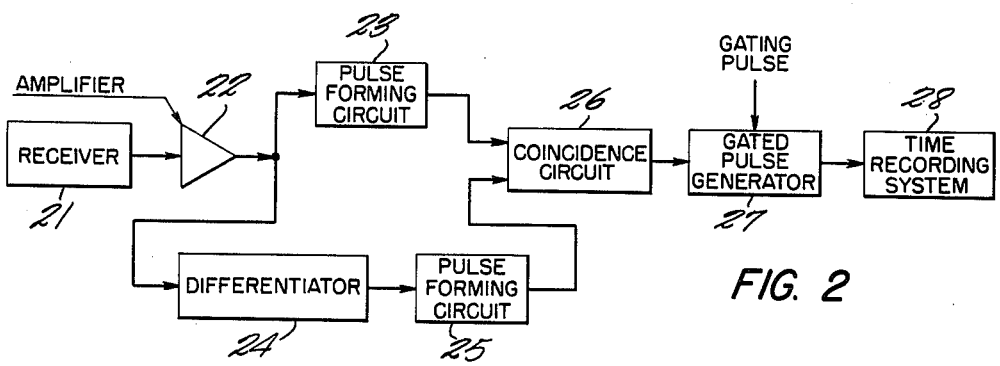
FIGS. 2–6 are schematic diagrams of typical detecting systems constructed in accordance with the invention.

With reference to FIG. 2, a receiver 21 is connected to an amplifier 22 which supplies outputs to a pulse forming circuit 23 and a differentiator circuit 24. The voltage output from the amplifier 22 is represented by waveform (a), FIG. 9, and the voltage level or threshold required to trigger the pulse forming circuit 23 is indicated by the line 18. Whenever the input voltage rises above this threshold, the pulse forming circuit 23 produces a positive voltage pulse as indicated by the waveform (b), FIG. 9. The circuit 24 differentiates the amplifier output voltage and produces an output voltage which is represented by the waveform (c), FIG. 9. This voltage is fed into a pulse forming circuit 25 which is adapted to produce a positive going pulse whenever the input voltage goes below the zero line, as is illustrated by waveform (d), FIG. 9. The voltage outputs from the circuits 23 and 25, represented by the waveforms (b) and (d), respectively, are fed into a coincidence circuit 26 that is activated whenever its two inputs are simultaneously positive. This condition is first realized at the time corresponding to the first peak 19 of the waveform (a). When it is activated, the coincidence circuit 26 causes the gated pulse generator 27 to trigger if a gating pulse from an external circuit is also present. The time at which the gated pulse generator is triggered is then recorded by a time recording system 28. The gating pulse provided from an external circuit is not necessary to this system but it is desirable because it reduces false triggering due to stray noise signals. For example, a noise signal such as 29, waveform (a) could produce a pulse 30, waveform (b) which could trigger the system if a gating pulse were not also required. The gating pulse is usually a square wave provided by a monostable multivibrator which is timed to trigger just prior to the earliest possible arrival of the acoustic wave at the receiver.

The time recording system 28 is usually a system which measures the time interval between the arrival of the wave at the two receivers 15 and 16. One method of accomplishing this is to have the pulses from the gated pulse generators control the operation of a gate so as to control the passage of pulses from an oscillator to a counter.

The system illustrated in FIG. 2 has a distinct advantage over prior detecting systems because it improves the accuracy of detection of the first arrival of the incoming acoustic wave by detecting the peak of the wave regardless of its amplitude.

Figure 3:
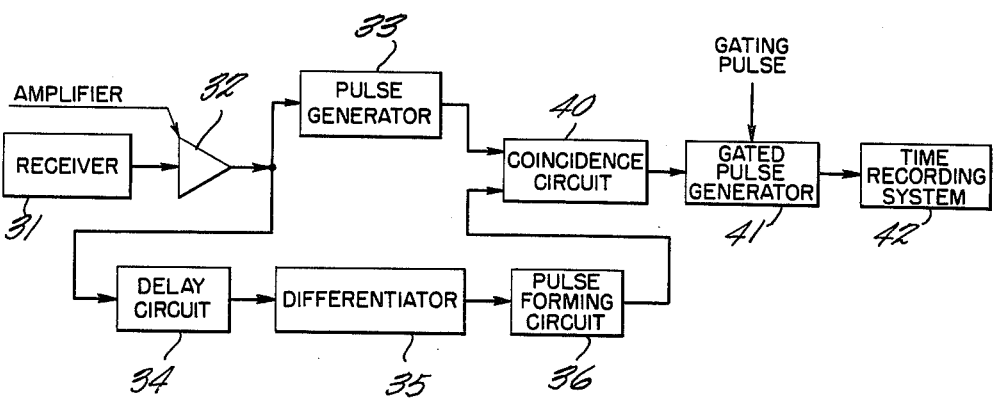

The embodiment of the invention illustrated in FIG. 3 includes a receiver 31 that has its output connected to an amplifier 32. The amplifier 32 provides outputs to a pulse generator circuit 33 and a delay circuit 34. The delay circuit 34 produces a time delay that is approximately equivalent to the time interval between the two peaks 19 and 20 of waveform (a), FIG. 9. For convenience of illustration, the output from the delay circuit 34 is represented by waveform (a), FIG. 9, and the undelayed input to the pulse forming circuit 33 is represented by waveform (e). By a comparison of these two waveforms, it can be seen that waveform (a) lags in time behind waveform (e).

The delayed signal is fed into a differentiator circuit 35 which produces an output voltage represented by waveform (c) which in turn is fed into a pulse forming circuit 36. The circuit 36 provides a positive pulse whenever its input is negative as is shown by waveform (d). The pulse generator circuit 33 produces a single positive pulse when the voltage input first rises above a threshold voltage level. This threshold is set at the level indicated by the line 37, waveform (e) and the voltage input first reaches this level at the point 38 and causes the pulse generator circuit to produce a positive pulse 39, waveform (f). Note that the threshold 37 can be made much higher than the threshold 18 on waveform (a) because peak 20 is higher than peak 19.

The voltage outputs from the pulse generator 33 and the pulse forming circuit 36, represented by waveforms (f) and (d), respectively, are fed into a coincidence circuit 40 which is connected to a gated pulse generator 41 which in turn is connected to a time recording system 42. The circuit 40, the generator 41 and the system 42 all operate similarly to the analogous elements in FIG. 2. Both of the inputs to the coincidence circuit 40 are positive at the time corresponding to the leading edge of the pulse 43, waveform (d) which causes the generator 41 to trigger at this point.

This detecting system has an advantage over conventional systems in that its accuracy is increased because it is triggered by a peak of the incoming wave, and because false triggering due to noise signals is virtually eliminated because of the high threshold level.

Figure 4:
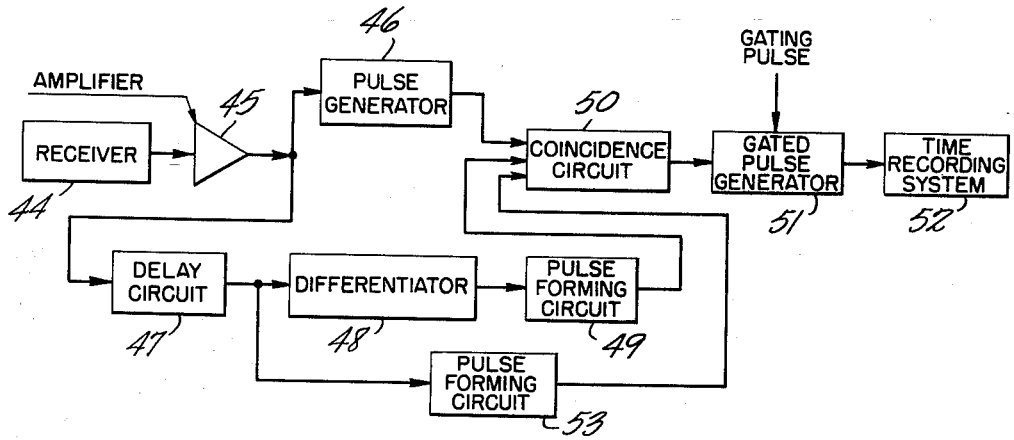

The embodiment of the invention illustrated in FIG. 4 includes a receiver 44 that has its output connected to an amplifier 45. The amplifier 45 provides outputs to a pulse generator circuit 46 and a delay circuit 47. The delay circuit 47 is connected to a differentiator circuit 48 which is connected to a pulse forming circuit 49. The pulse generator 46 and the pulse forming circuit 49 both have their outputs connected to a coincidence circuit 50 which operates a gated pulse generator 51 and a time recording system 52. The analysis of this portion of the circuit is similar to that given previously in regard to FIG. 3. The difference between the circuits illustrated in FIGS. 3 and 4 is that the latter includes a pulse forming circuit 53 which is connected to the output from the delay circuit 47 and which has its output connected to the coincidence circuit 50. This pulse forming circuit produces a positive pulse whenever its input voltage rises above a positive threshold level. This threshold level is indicated by the line 18, waveform (a) and the circuit produces a voltage output which is represented by the waveform (b). The outputs from the pulse generator 46, the pulse forming circuit 49 and the pulse forming circuit 53, represented by the waveforms (f), (d) and (b), respectively, are fed into the coincidence circuit 50 which triggers the gated pulse generator circuit 51 whenever the three voltages are simultaneously positive. This condition is first realized at a time corresponding to the peak 19 of the waveform (a) which coincides with positive portions of the waveforms (b), (d) and (f).

It can be seen that the embodiment of the invention illustrated in FIG. 4 provides the most protection from noise of the various embodiments illustrated because three coincident pulses are required for triggering. Thus, in order for noise to trigger this circuit there would have to be a pulse of amplitude greater than the threshold 18 in waveform (a) followed by a pulse greater than the threshold 37 in waveform (e) which is not likely to occur. This embodiment also possesses the advantages inherent in triggering on a peak of the wave.

Figure 5:
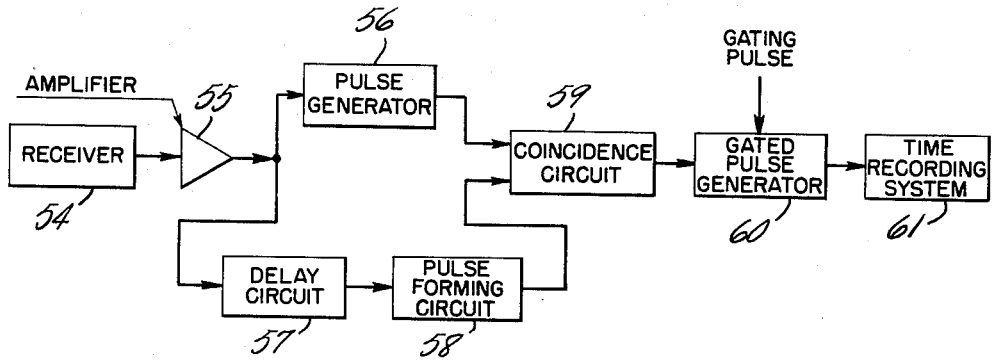

In FIG. 5 is illustrated an embodiment of the invention that includes a receiver 54 which has its output connected to an amplifier circuit 55. The amplifier circuit 55 provides outputs to a pulse generator circuit 56 and a delay circuit 57. The pulse generator 56 produces a single positive pulse as shown by the waveform (f) when the voltage output from the amplifier 55 first exceeds the threshold level 37. The output from the delay circuit 57 is fed into a pulse forming circuit 58 which produces a positive pulse whenever the voltage output from the delay circuit exceeds the threshold level 18, waveform (a). The outputs from the pulse generator 56 and the pulse forming circuit 58, represented by the waveforms (f) and (b), respectively, are fed into a coincidence circuit 59 which triggers a gated pulse generator 60. The triggering of the generator 60 is recorded by a recording system 61 as explained previously.

The system illustrated in FIG. 5 has the advantage that the threshold level of the pulse forming circuit 58, represented by the line 1 of the waveform (a) can be reduced to nearly zero to prevent the system from missing a low amplitude pulse. The system is not likely to be triggered by a stray noise signal because the pulse generator 56 still requires a substantially higher voltage level before it will be triggered. This system has a disadvantage, however, in that the time of triggering will depend on the amplitude of the incoming wave.

Figure 6:
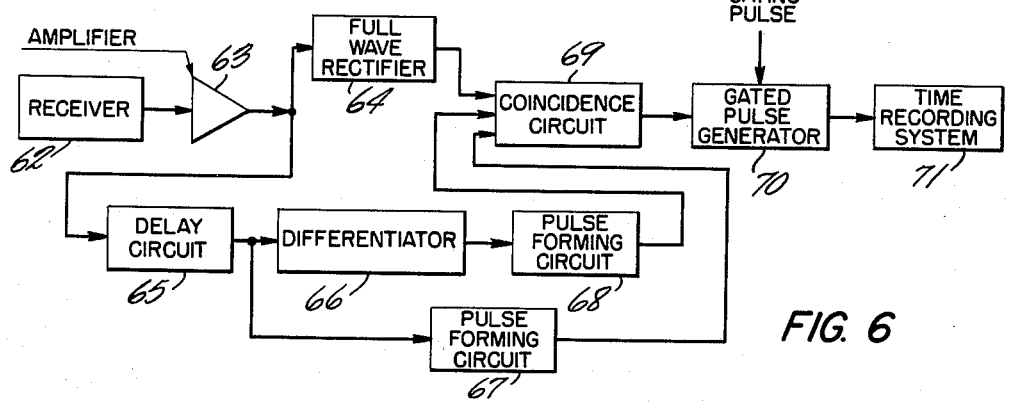

The system illustrated in FIG. 6 is similar to the system illustrated in FIG. 4 and includes a receiver 62 that has its output connected to an amplifier 63. The amplifier 63 provides outputs to a full wave rectifier 64 and to a delay circuit 65. The delay circuit 65 provides outputs to a differentiator circuit 66 and to a pulse forming circuit 67. The differentiator circuit 66 has its output connected to a pulse forming circuit 68 which is connected to a coincidence circuit 69 along with the full wave rectifier 64 and the pulse forming circuit 67. The coincidence circuit 69 is connected to operate a gated pulse generator 70 and a time recording system 71.

It will be noted that the main difference between this system and the system illustrated in FIG. 4 is the substitution of the full wave rectifier 64 for the pulse generator 46. The rectifier 64 produces an output voltage which is represented by the waveform (h) and which becomes positive at approximately the same point in time as the voltage output from the pulse generator 46. The analysis and the advantages of the two systems are very similar and need not be repeated.

Figure 7:
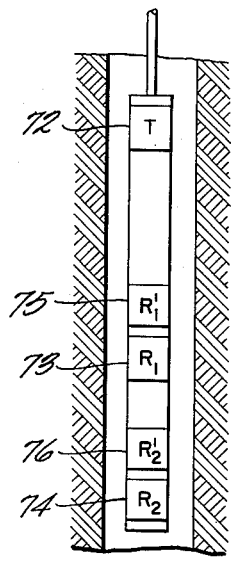
FIG. 7 is a section through the earth schematically illustrating an acoustic well logging apparatus constructed in accordance with an alternative embodiment of the invention.
Figure 8:
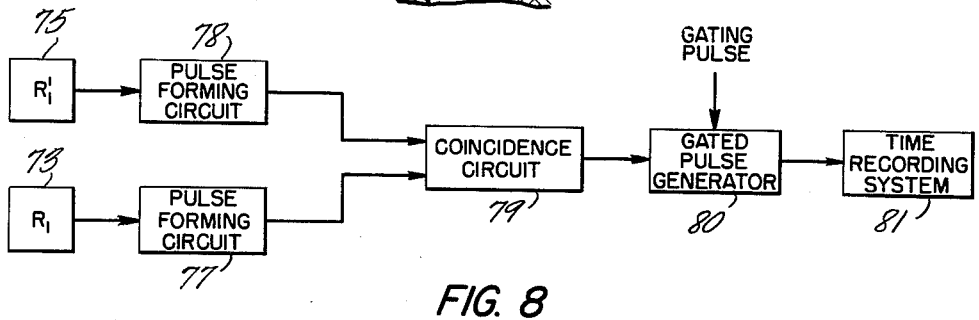
FIG. 8 is a schematic diagram of a typical detecting system adapted for use with the well logging apparatus illustrated in FIG. 7.

FIGS. 7 and 8 illustrate an alternative method of splitting the incoming signal into two portions and effecting a time displacement between the two portions. A system of this type could be employed in place of the delay circuits employed in the embodiments illustrated in FIGS. 3–6.

The well logging apparatus illustrated in FIG. 7 includes a transmitter 72 and two receivers 73 and 74. Two auxiliary receivers 75 and 76 are disposed immediately in front of the receivers 73 and 74, respectively, in the direction of the transmitter 72.

FIG. 8 illustrates the operation of one pair of these receivers, such as the receivers 73 and 75, and a detecting system connected to these receivers. An acoustic wave, which is generated by the transmitter 72 travels through the earth formations surrounding the bore and passes the receivers 75 and 73 in succession. When the wave reaches the receivers, they generate voltages which are fed to two pulse forming circuits 78 and 77 that are adapted to produce positive pulses whenever their input voltages exceed a threshold level. The voltage outputs from the receivers 73 and 75 are represented by the waveforms (a) and (e) respectively while the voltage outputs from the pulse forming circuits 77 and 78 are represented by the waveforms (b) and (f) respectively. Thus, receiver 73 is triggered by the first peak while receiver 75 is triggered by the later arriving larger peak. The outputs from the pulse forming circuits 77 and 78 are connected to a coincidence circuit 79 that is activated whenever its two inputs are simultaneously positive. When this occurs, the coincidence circuit 79 activates a gated pulse generator 80 and a time recording system 81 provided a gating pulse is also present as was previously explained.

Since the two receivers 73 and 75 are at different distances from the transmitter 72 the acoustic waves generated by the transmitter 72 reach the receivers at different times. This produces a time displacement between the voltages received by the pulse forming circuits 77 and 78 similar to the time displacement produced by the delay circuits in the other embodiments of the invention. It should be apparent that the concept of using two displaced receivers could be applied to any embodiment of the invention that requires a time displacement.

The pulse generator circuits 33, 46 and 56 shown in FIGS. 3, 4 and 5 are designed to automatically return to their normal condition after being triggered prior to the arrival of the next acoustic wave at the receivers. This may be accomplished, for example, by making these generators multivibrator-type circuits and designing the time constants so that they will return to their normal condition prior to the next wave. The gated pulse generators described are designed to produce a single sharp pulse when they are energized.

It will be appreciated that negative as well as positive peaks may be used and more or less any number of peaks may be used simultaneously.

While particular embodiments of the present invention have been shown and described for purposes of illustration, it is apparent that changes and modifications may be made without departing from this invention in its broader aspects. Therefore, the invention described herein is not to be construed as limited to the specific embodiments described but is intended to encompass all modifications thereof coming within the scope of the following claims.

I claim:

1. In an apparatus for determining the instant of arrival at a given location in a medium of an acoustic wave having characteristic portions being propagated in the medium, the combination of an individual transducer disposed in the medium which is responsive to energy in said acoustic wave for converting the same to a single electric signal having characteristic portions that correspond to said characteristic portions of said acoustic wave, at least first and second circuit means coupled to said transducer respectively responsive to values above different predetermined minimums of separate amplitude characteristics of said single electric signal for developing at least first and second output signals having a predetermined time relationship, and means responsive to said output signals for providing a signal representative of the occurrence of said predetermined time relationship of said output signals.

2. In an apparatus for determining an instant of arrival at a given location in a medium of a characteristically varying acoustic wave having a plurality of amplitude peaks with respect to a reference value being propagated in the medium, the combination of transducer means disposed in the medium which is responsive to energy in said acoustic wave for converting the same to an electrical signal varying similarly to said acoustic wave and having a plurality of amplitude peaks with respect to a reference value, at least first and second circuit means responsive to said electric signal for developing at least first and second outputs, respectively, said first and second outputs having pulses when said peaks exceed respectively different predetermined amplitudes relative to said reference value, means coupled to at least one of said first and second circuit means for delaying in time at least one of said outputs, and coincidence means responsive to said delayed and undelayed outputs which will be activated to produce a signal only when selected pulses of said outputs are substantially coincident in time.

3. In an apparatus for determining an instant of arrival at a given location along a borehole traversing earth formation of a characteristically varying acoustic wave being propagated in the formations, the combination of an individual transducer means disposed in the borehole which is responsive to energy in said acoustic wave for convertng the same to a single electric signal characteristically varying in the same manner as said acoustic wave, at least first and second circuit means responsive to characteristics of said electric signal for developing at least first and second output signals, respectively, having a plurality of pulses that occur at varying instants in time, delay means connected to at least one of said circuit means for delaying in time the output signals therefrom, and coincidence circuit means responsive to said delayed output signals and to the undelayed output signals which will be activated to produce a signal only when certain of said pulses of said delayed output signals are substantially coincident in time with certain of said pulses of said undelayed output signals.

4. In an apparatus for determining an instant of arrival at a given location in a medium of a characteristically varying acoustic wave being propagated in the medium, the combination of transducer means disposed in the medium which is responsive to energy in said acoustic wave for converting the same to an electric signal varying with respect to a reference value, first circuit means responsive to each excursion of said electric signal beyond a predetermined value other than said reference value for producing a first output signal having a plurality of pulses, second circuit means responsive to each excursion of the rate of change of said electric signal beyond a predetermined value for producing a second output signal having a pluraltiy of pulses, and coincidence means jointly responsive to said first and said second output signals which will be activated to produce a signal only when certain of said pulses of said first and said second output signals are substantially coincident in time.

5. In an apparatus for determining an instant of arrival at a given location along a borehole traversing earth formations of a characteristically varying acoustic wave being propagated in the formations, the combination of transducer means disposed in the borehole which is responsive to energy in said acoustic wave for converting the same to a varying electric signal having a plurality of amplitude peaks with respect to a reference value, first means responsive to each excursion of said electric signal beyond a predetermined value with respect to said reference value for producing a first output having a plurality of pulses, second means responsive to each excursion of the rate of change of said electric signal beyond a predetermined value for producing a second output having a plurality of pulses, means coupled to at least one of said first and second means rendering selected pulses of said first and said second outputs substantially coincident in time, and coincidence means responsive to said first and said second outputs which will be activated to produce a signal only when said selected pulses of said first and said second outputs are substantially coincident in time.

6. In an apparatus for determining an instant of arrival at a given location in a medium of a characteristically varying acoustic wave being propagated in the medium, the combination of transducer means disposed in the medium which is responsive to energy in said acoustc wave for converting the same to a varying electric signal having a plurality of amplitude peaks with respect to a reference value, first means responsive to each excursion of said electric signal beyond a predetermined value with respect to said reference value for producing a first output having a plurality of pulses, second means responsive to each excursion of the rate of change of said electric signal beyond a predetermined value for producing a second output having a plurality of pulses, third means responsive to each excursion of said electric signal beyond a predetermined value with respect to said reference value for producing a third output having a plurality of pulses, means coupled to said second and third means for delaying in time said second and third outputs, and coincidence means responsive to said first, second and third outputs which will be activated to produce a signal only when selected pulses of said outputs are substantially coincident in time.

7. In an apparatus for determining an instant of arrival at a given location in a medium of a characteristically varying acoustic wave having a plurality of amplitude peaks with respect to a reference value being propagated in the medium, the combination of transducer means disposed in the medium which is responsive to energy in said acoustic wave for convertng the same to an electric signal varying similarly to said acoustic wave and having a plurality of amplitude peaks with respect to a reference value, first means responsive to each excursion of said electric signal beyond a predetermined value with respect to said reference value for producing a first output having a plurality of pulses, second means responsive to each excursion of said electric signal beyond a predetermined value with respect to said reference value for producing a second output having a plurality of pulses, means coupled to said second means for delaying in time said second output, and coincidence means responsive to said first and said second outputs which will be activated to produce a signal only when selected pulses of said first and said second outputs are substantially coincident in time.

8. In an apparatus for determining an instant of arrival at a given location along a borehole traversing earth formation of a characteristically varying acoustic wave being propagated in the formations, the combination of transducer means disposed in the borehole which is responsive to energy in said acoustic wave for converting the same to a varying electric signal having a plurality of amplitude peaks with respect to a reference value, pulse generator means responsive to said transducer means for producing a pulse each time said signal exceeds a first predetermined value with respect to said reference value, pulse forming means responsive to said transducer means for producing a pulse each time said signal exceeds a second predetermined value with respect to said reference value, said first predetermined value being different from said second predetermined value, means coupled to said pulse forming means for delaying in time the pulses therefrom, and coincidence circuit means coupled to said pulse generator and said pulse forming means which will be activated to produce an output only when pulses from said pulse generator and said pulse forming means are substantially coincident in time.

9. In an apparatus for determining an instant of arrival at a given location in a medium of a characteristically varying acoustic wave being propagated in the medium, the combination of transducer means disposed in the medium which is responsive to energy in said acoustic wave for converting the same to a varying electric signal having a plurality of amplitude peaks with respect to a reference value, first pulse forming circuit means responsive to said transducer means for producing a pulse each time said signal exceeds a predetermined value with reference to said reference value, differentiator means responsive to said transducer means for differentiating said signal, second pulse forming circuit means responsive to each excursion of said differentiated signal beyond a predetermined value with respect to said reference value for to produce a pulse, and coincidence circuit means responsive to said first and second pulse forming circuit means which will be actuated to produce an output signal when said pulses are substantially coincident in time.

10. An apparatus for determining an instant of arrival at a given location in a medium of a characteristically varying acoustic wave being propagated in the medium, the combination of transducer means disposed in the medium which is responsive to energy in said acoustic wave for converting the same to a varying electric signal having a plurality of amplitude peaks with respect to a reference value, second transducer means disposed in said medium and displaced from said first transducer means in a direction toward the source of said acoustic wave, said second transducer means also being responsive to energy in said acoustic wave for converting the same to a varying electric signal having a plurality of amplitude peaks with respect to said reference value, means responsive to each excursion beyond a first value with respect to said reference value of said electric signal from said first transducer means for producing a first output having a plurality of pulses, second means responsive to each excursion beyond a second value with respect to said reference value of said electric signal from said second transducer means for producing a second output having a plurality of pulses, said first value being different from said second value, and coincidence means responsive to said first and said second outputs which will be activated to produce a signal only when selected pulses of said first and said second outputs are substantially coincident in time.

11. In a system for determining the velocity of a test signal transmitted past at least two spaced signal responsive means, apparatus at each of said signal responsive means for developing an output signal having a given relationship to said test signal comprising, first circuit means coupled to each of said signal responsive means and responsive to a value above a predetermined minimum of a first amplitude characteristic of said test signal for developing a first pulse, second circuit means coupled to each of said signal responsive means and responsive to a value above a predetermined minimum of a second amplitude characteristic of said test signal to develop a second pulse, and means coupled to said first and second circuit means at each of said signal responsive devices for generating said output signal upon time coincidence of said first and second pulses.

12. The apparatus of claim 11 wherein said first circuit means comprises a pulse generator responsive to an amplitude of said test signal above a predetermined minimum amplitude and said second circuit means comprises a pulse generator responsive to a predetermined rate of change of amplitude of said test signal.

13. The apparatus of claim 12 wherein there is further provided at least one of said signal responsive devices third circuit means responsive to a third amplitude characteristic of said test signal for developing a third pulse, and wherein the associated means for generating said output signal is operative upon time coincidence of said first, second and third pulses.

14. The apparatus of claim 11 wherein said first circuit means comprises a pulse generator responsive to an amplitude of said test signal above a first predetermined minimum amplitude and said second circuit means comprises signal delay means and a pulse generator responsive to an amplitude of said delayed test signal above a second predetermined minimum amplitude.

15. In a system for determining the characteristics of an acoustic signal transmitted through earth formations traversed by a borehole having an acoustic transmitter disposed in said borehole for propagating an acoustic signal through the surrounding earth formations and at least two acoustic signal receivers disposed in said borehole spaced from said transmitter and from each other, the improvement comprising first circuit means at each of said receivers for developing a first electrical pulse in response to a first amplitude characteristic of the acoustic signal received thereat, second circuit means at each of said receivers for developing a second electrical pulse in response to a second amplitude characteristic of the acoustic signal received thereat, and coincidence circuit means coupled to the said first and second circuit means at each of said receivers to generate an output signal upon time coincidence of said respective first and second pulses, whereby a pair of output pulses indicative of the times of arrival of the acoustic signal at the respective receivers is derived.

References Cited by the Examiner
UNITED STATES PATENTS

| | | | |
|---|---|---|---|
| 2,767,388 | 10/1956 | Rust | 181—0.5 |
| 2,857,011 | 10/1958 | Summers | 181—.53 |
| 2,861,184 | 11/1958 | Alexander et al. | 328—109 |
| 2,897,351 | 7/1959 | Melton. | |
| 2,938,592 | 5/1960 | Charske et al. | 181—.53 |
| 2,941,184 | 6/1960 | Moody | 181—0.5 |
| 2,956,634 | 10/1960 | Zemanek et al. | 181—.53 |
| 2,963,646 | 12/1960 | Hicks et al. | |
| 2,972,733 | 2/1961 | Bucy | 181—0.5 X |
| 2,978,673 | 4/1961 | Graham | 181—0.5 X |
| 2,982,943 | 5/1961 | Isaacson et al. | 340—18 |
| 3,019,413 | 1/1962 | Brokaw | 340—15.5 |
| 3,048,835 | 8/1962 | Perkins | 343—6.8 |

BENJAMIN A. BORCHELT, *Primary Examiner.*

SAMUEL FEINBERG, CHESTER L. JUSTUS, CARL W. ROBINSON, *Examiners.*